United States Patent
Koo et al.

(10) Patent No.: US 8,254,968 B2
(45) Date of Patent: Aug. 28, 2012

(54) SYSTEM AND METHOD FOR LOW OVERHEAD PAGING IN A WIRELESS COMMUNICATIONS SYSTEM

(75) Inventors: Changhoi Koo, Plano, TX (US); Sean Michael McBeath, Keller, TX (US)

(73) Assignee: FutureWei Technologies, Inc., Plano, TX (US)

( * ) Notice: Subject to any disclaimer, the term of this patent is extended or adjusted under 35 U.S.C. 154(b) by 377 days.

(21) Appl. No.: 12/568,461

(22) Filed: Sep. 28, 2009
(Under 37 CFR 1.47)

(65) Prior Publication Data
US 2010/0248749 A1    Sep. 30, 2010

Related U.S. Application Data

(60) Provisional application No. 61/100,974, filed on Sep. 29, 2008.

(51) Int. Cl.
*H04W 68/00* (2009.01)

(52) U.S. Cl. ............... 455/458; 455/433; 455/435.1

(58) Field of Classification Search .................. 455/458, 455/435.1, 433
See application file for complete search history.

(56) References Cited

U.S. PATENT DOCUMENTS

| | | | | |
|---|---|---|---|---|
| 5,361,396 A * | 11/1994 | Onoe et al. | ............... | 455/435.1 |
| 6,680,920 B1 * | 1/2004 | Wan | ............... | 370/311 |
| 7,668,147 B2 * | 2/2010 | Lindsay et al. | ............... | 370/347 |
| 2005/0282562 A1 * | 12/2005 | Lee et al. | ............... | 455/458 |
| 2006/0194581 A1 * | 8/2006 | Kang et al. | ............... | 455/436 |
| 2007/0055778 A1 * | 3/2007 | Park et al. | ............... | 709/226 |

* cited by examiner

*Primary Examiner* — Rafael Pérez-Gutiérrez
*Assistant Examiner* — Liton Miah
(74) *Attorney, Agent, or Firm* — Slater & Matsil, L.L.P.

(57) ABSTRACT

A system and method for low overhead paging in a wireless communications system is provided. A method for controller operation includes generating a compressed map, receiving an incoming call intended for a communications device, and broadcasting the compressed map to communications devices served by the controller. The compressed map includes indications of paging groups of the controller.

20 Claims, 9 Drawing Sheets

| Type | Total # of PG (N) | Compressed MAP length | Total |
|---|---|---|---|
| 000 | 2 | 2bit | 5bits |
| 001 | 4 | 4bits | 7bits |
| 010 | 8 | 8bits | 11bits |
| 011 | 16 | 16bits | 19bits |
| 100 | 32 | 32bits | 35bits |
| 101–111 | Reserved | | |

*Fig. 9*

| Configuration | Information | Channel |
|---|---|---|
| 1 | Type | P-BCH |
| | Contents | P-BCH |
| 2 | Type | S-BCH |
| | Contents | S-BCH |
| 3 | Type | P-BCH |
| | Contents | S-BCH |
| 4 | Type | S-BCH |
| | Contents | P-BCH |

SYSTEM AND METHOD FOR LOW OVERHEAD PAGING IN A WIRELESS COMMUNICATIONS SYSTEM

This application claims the benefit of U.S. Provisional Application No. 61/100,974, filed on Sep. 29, 2008, entitled "Method and Apparatus for Paging Operation with Low Overhead and Quick Location Update Time," which application is hereby incorporated herein by reference.

TECHNICAL FIELD

The present invention relates generally to wireless communications, and more particularly to a system and method for low overhead paging in a wireless communications system.

BACKGROUND

In wireless communications systems, such as IEEE 802.16m, WiMAX, or so forth, a mobile station (or MS, subscriber, user, User Equipment (UE), or so forth) may enter an idle mode when it is not actively exchanging information (e.g., user data) with a base station (or BS, base terminal server, NodeB, ehanced NodeB, and so on). When the mobile station is in the idle mode, the mobile station may conserve power by turning off its transmitter and receiver. However, to ensure that it remains abreast of incoming calls (or connections), the mobile station may turn on its receiver at specified times to detect pages sent by the base station.

As used herein, a call may be a voice call that allows verbal communications. Additionally, a call may also be a data connection wherein a data (digital and/or analog) may be exchanged. For example, a user may utilize a computer and a data connection may be established for a mobile station used by the user, allowing the user to browse Internet web pages, download music, video, multimedia, stream videos, access public and private networks, share information, and so forth.

Typically, a page is a message sent by a base station in a wireless communications system to a mobile station to notify the mobile station that there is an incoming call (or connection) for the mobile station. When the mobile station receives a paging message, the mobile station may send a response message to the wireless communications system to request a traffic channel. When granted a traffic channel, the mobile station may indicate to its user that there is a waiting call (or connection).

While a mobile station is in idle mode, a base station will serve as the mobile station's selected base station (SBS). The mobile station synchronizes to the SBS, acquires its operational and configuration parameters, and monitors its transmissions for paging notifications during predetermined times. As a mobile station moves through a communications system, it may choose a new SBS based on its signal strength relative to other BSs. Selecting a new SBS does not require the mobile station to exchange messages with the communications system.

As the mobile station moves through a communications system, it may use a location update procedure to inform the communications system of its location so that paging notifications can be delivered to its SBS. When the mobile station performs the location update procedure, it exchanges messages with the communications system, so it may be beneficial if the mobile station does not update its location every time it selects a new SBS due to power consumption considerations.

To help reduce the need for the mobile station to perform location updates, base stations may be grouped together into paging groups according to their proximity to each other and the mobile station updates its location only when it selects a base station in a paging group different from the paging group of the mobile station's current SBS. This means that the mobile station's location is not tracked with a granularity of a single base station so multiple base stations (i.e., base stations in the same paging group) must transmit paging notifications for the same mobile station.

SUMMARY OF THE INVENTION

These and other problems are generally solved or circumvented, and technical advantages are generally achieved, by embodiments of a system and method for low overhead paging in a wireless communications system.

In accordance with an embodiment, a method for method for controller operation is provided. The method generating a compressed map, receiving an incoming call intended for a communications device, and broadcasting the compressed map to communications devices served by the controller. The compressed map comprises indications of paging groups of the controller.

In accordance with another embodiment, a method for communications device operation is provided. The method includes receiving an indication of a total number of paging groups and a compressed map, applying a paging rule to a paging group identifier of the communications device, thereby producing a value, completing a paging operation in response to determining that a bit of the compressed map at a location corresponding to the value is set to a specified value, and initiating a location update in response to determining that the bit of the compressed map at the location corresponding to the value is not set to the specified value.

In accordance with another embodiment, a method for base station operation is provided. The method includes transmitting a type field to a mobile station, and transmitting a paging map to the mobile station. The type field indicates a format of a paging map. The paging map indicates the paging group to which the base station belongs, and an arrangement of paging groups in the paging map is based on a modulo operation.

An advantage of an embodiment is that signaling overhead for paging messages is reduced through the use of a compressed paging group map.

A further advantage of an embodiment is that a simple paging rule is used to enable a mobile station the ability to rapidly determine if it can continue with a paging operation or perform a location update.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely an IEEE 802.16m compliant wireless communications system, such as WiMAX wireless communications systems. The invention may also be applied, however, to other wireless communications systems wherein base stations are grouped into paging groups and a mobile station performs a location update if it is being served by a base station that is not a member of its paging group.

Figure 1:
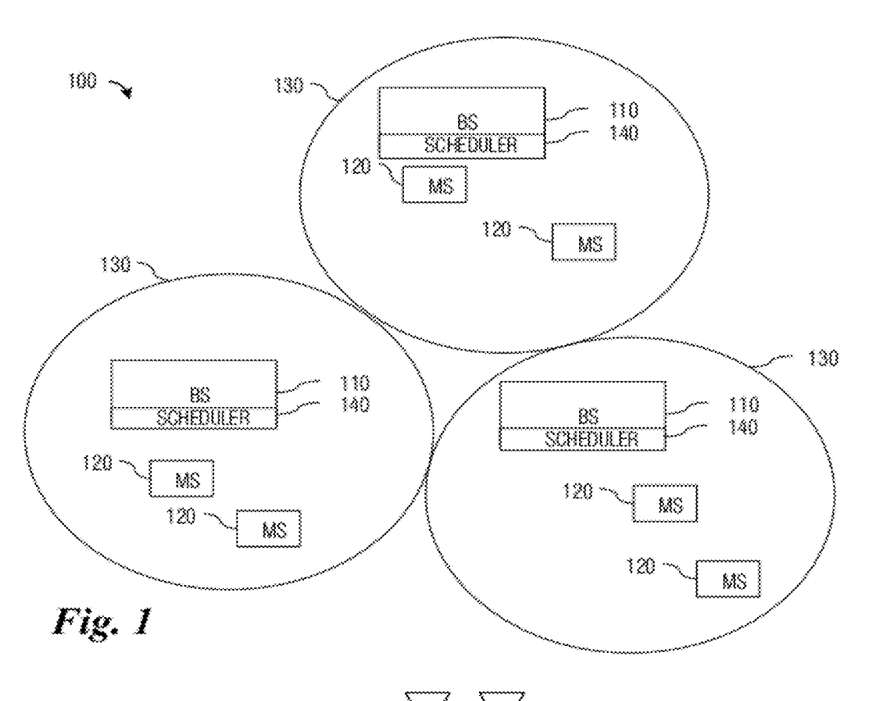
FIG. 1 is a diagram of a wireless communications network.

FIG. 1 illustrates a wireless communications network 100. Wireless communications network 100 includes a plurality of base stations (BS) 110 providing voice and/or data wireless communications service to a plurality of mobile stations (MS) 120. A BS may also be referred to as an access point (AP), an access network (AN), a Node-B, and so forth. Each BS 110 may have a corresponding coverage area 130. As shown in FIG. 1, each BS 110 includes a scheduler 140 for assigning radio resources to corresponding MS 120. Each BS has a corresponding coverage area 130. Each base station includes a scheduler 140 for allocating radio resources to the MSs.

Exemplary wireless communications systems include Evolved Universal Terrestrial Radio Access (E-UTRA) networks, Ultra Mobile Broadband (UMB) networks, IEEE 802.16 compliant networks, and other orthogonal frequency division multiple access (OFDMA) based networks. In some embodiments, a wireless communications system may be based on a multiple access technique other than OFDMA. For example, wireless communications network 100 may be a frequency division multiple access (FDMA) network where time-frequency resources may be divided into frequency intervals over time, a time division multiple access (TDMA) network where time-frequency resources may be divided into time intervals over frequency, a code division multiple access (CDMA) network where time-frequency resources may be divided into orthogonal or pseudo-orthogonal codes over time-frequency intervals, or a combination thereof.

Figure 2:
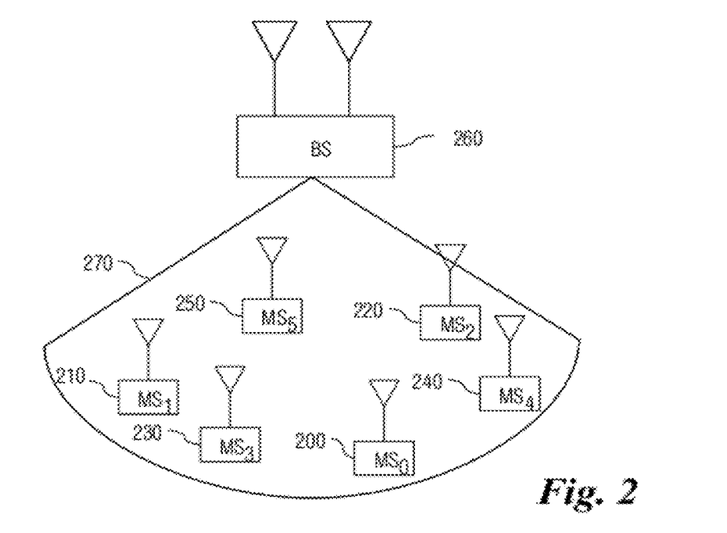
FIG. 2 is a diagram of a detailed view of a BS operating in a wireless communications network.

FIG. 2 illustrates a detailed view of a BS 260 operating in a wireless communications network. In general, in a three-sector configuration, BS 260 may have three coverage areas with coverage area 270 shown in FIG. 2. MSs, such as MS 200, 210, 220, 230, 240, and 250, may be operating in the coverage area 270. BS 260 may assign to each MS (i.e., MS 200, 210, 220, 230, 240, and 250) one or more connection identifiers (CID) or some other similar identifier to facilitate time-frequency resource assignment. The CID assignment may be transmitted from BS 260 to a MS over a control channel. Alternatively, the CID assignment may be permanently stored at the MS or derived based on parameter of the MS or BS 260, or the CID assignment may be derived based on a mobile station or base station parameter.

Figure 3:
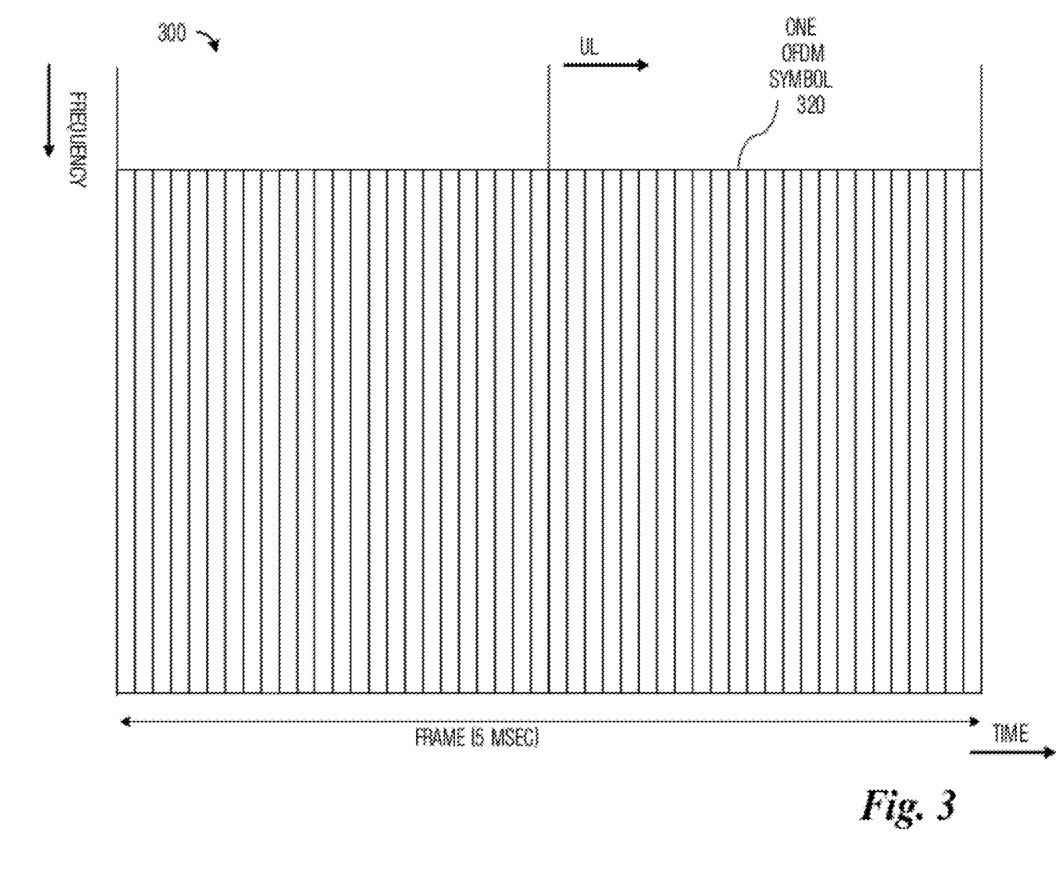
FIG. 3 is a diagram of a set of OFDMA time-frequency radio resources.

FIG. 3 illustrates a set of OFDMA time-frequency radio resources 300. In OFDMA systems, time-frequency resources 300 may be divided into OFDM symbols and OFDM subcarriers for allocation by a scheduler for use by the mobile stations. For example, in an exemplary OFDMA wireless communications system, the OFDM subcarriers are approximately 10 kHz apart and the duration of each OFDM symbol is approximately 100 μsec.

As shown in FIG. 3, one five (5) msec frame of an OFDMA system, such as that defined by an IEEE 802.16e standard, is highlighted. A frame duration of one five (5) msec is a possible frame duration, other frame durations are possible.

As shown in FIG. 3, resources in the time domain (displayed horizontally) may be divided into 48 OFDM symbols, such as OFDM symbol 320. In the frequency domain (vertical axis), the resources may be divided into multiple subchannels (not shown), wherein the size of a subchannel may depend on a subcarrier permutation scheme being utilized. A subcarrier permutation scheme is a mapping of logical subchannels to physical subcarriers. Exemplary subcarrier permutations include Downlink (DL) partial usage of subcarriers (PUSC), DL full usage of subcarriers (FUSC), and uplink (UL) PUSC defined in the IEEE 802.16 standard. Other permutation schemes are also defined in the IEEE 802.16 standard, so DL PUSC, DL FUSC, and UL PUSC are merely used to illustrate the embodiments.

For the DL PUSC subcarrier permutation scheme, in a 5 MHz bandwidth, there are 360 data subcarriers divided into 15 subchannels, wherein each subchannel has 24 data subcarriers. For the DL PUSC subcarrier permutation scheme, the base station must assign an even number of OFDM symbols for each subchannel, while for DL FUSC, in a 5 MHz bandwidth, there are 384 data subcarriers divided into 8 subchannels, wherein each subchannel has 48 data subcarriers. For UL PUSC subcarrier permutation scheme, in a 5 MHz bandwidth, there are 408 subcarriers (made up of data plus pilot subcarriers) divided into 17 subchannels, wherein each subchannel has 24 subcarriers (16 data plus 8 pilot subcarriers). For UL PUSC, the number of OFDM symbols for each subchannel must be a multiple of 3.

The subchannels may be a logical representation of the time-frequency resources of the system. Each logical time-frequency resource (subchannel) maps to a physical time-frequency resource. The mapping of logical time-frequency resources to physical time-frequency resources may depend on which subcarrier permutation is being used. The mapping of logical time-frequency resource to physical time-frequency resources may change with time and may depend on one or more parameters defined by the wireless communications system.

Figure 4:
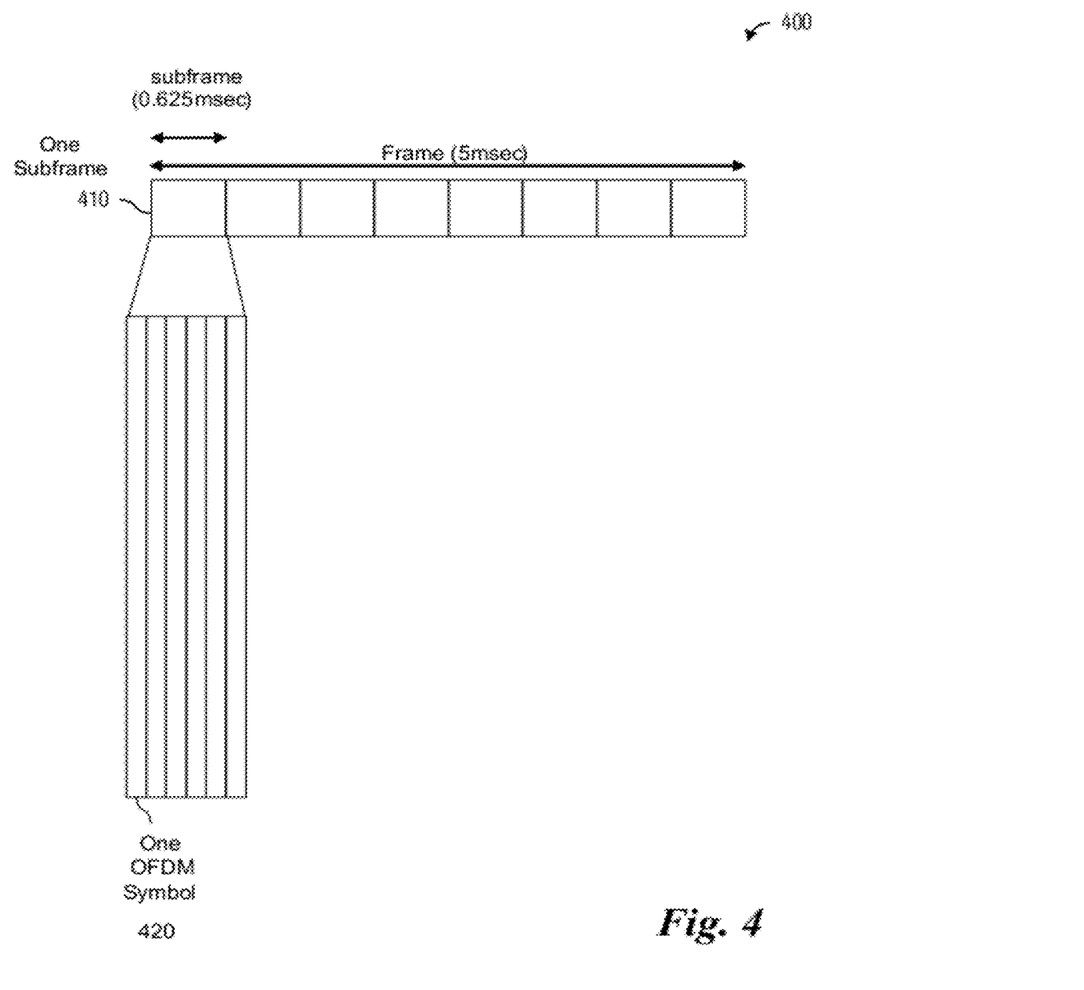
FIG. 4 is a diagram of a frame divided into a number of subframes.

FIG. 4 illustrates a frame 400 divided into a number of subframes. Frame 400 may be a high level view of a set of OFDMA time-frequency radio resources 300 shown in FIG. 3. Frame 400 may be divided into eight (8) equal subframes, such as subframe 410. Each subframe may be designated as a DL subframe or a UL subframe and comprises six (6) OFDM symbols, such as OFDM symbol 420. The number of symbols in a subframe may vary as the OFDM numerology varies, the bandwidth varies, the TDD time gaps vary, and the like. The time-frequency resources of each subframe may be represented by a channel tree.

Figure 5:
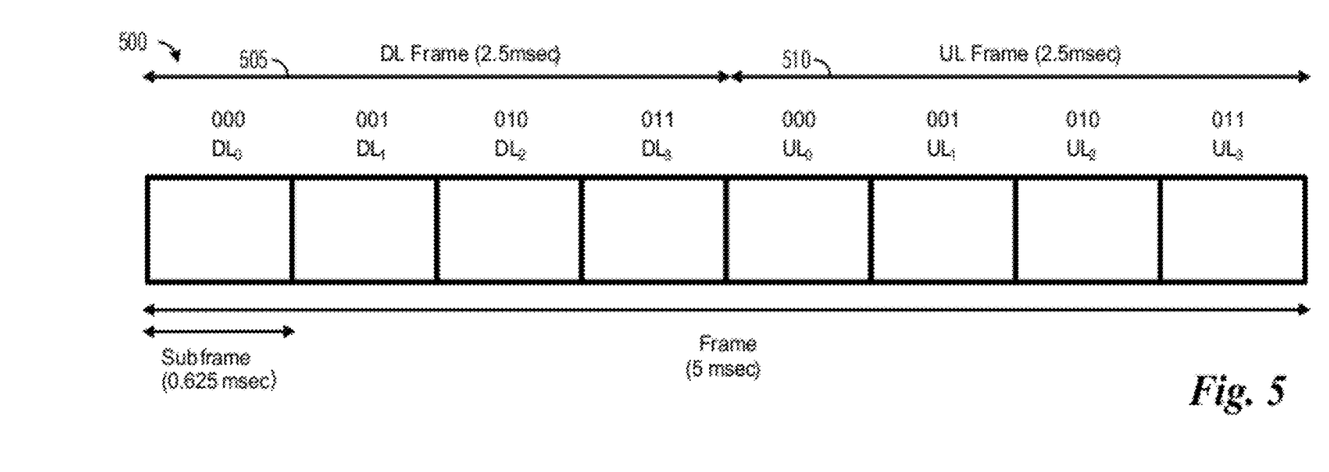
FIG. 5 is a diagram of a series of subframes in a frame.

FIG. 5 illustrates a series of subframes in a frame 500. As shown in FIG. 5, frame 500 is divided into a DL frame 505 and a UL frame 510. DL frame 505 may be divided into four (4) subframes, denoted DL0, DL1, DL2, and DL3 and numbered 000, 001, 010 and 011, respectively. Similarly, UL frame 510 may be divided into four (4) subframes, denoted UL0, UL1, UL2, and UL3 and numbered 000, 001, 010 and 011, respectively. The subframe structure may be used to make persistent assignments. For example, if a persistent assignment period is four (4) frames, then the assigned time-frequency resource in one or more subframes repeats every four frames. Similarly, if the persistent assignment period is one frame, then the assigned time-frequency resource in one or more subframes repeats every frame.

As an additional example, in an FDD system with eight (8) subframes, the numbering of subframes for the DL may be 000, 001, 010, 011, 100, 101, 110, and 111, and the numbering of subframes for the UL may be 000, 001, 010, 011, 100, 101, 110, and 111.

Figure 6:
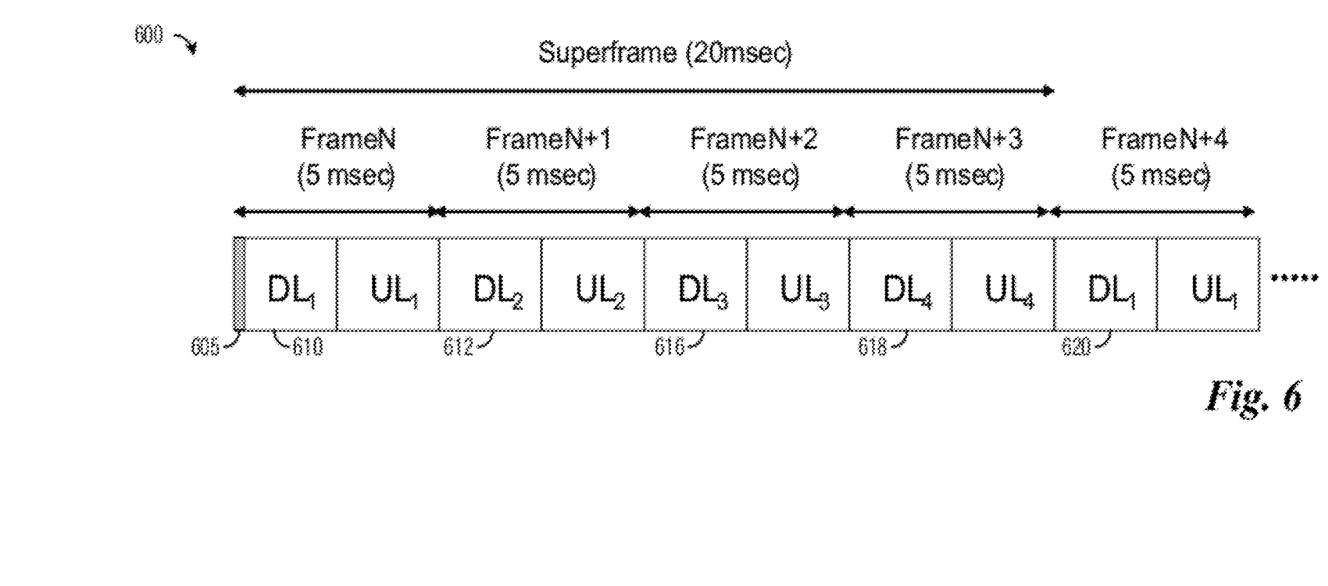
FIG. 6 is a diagram of a repeating sequence of frames.

FIG. 6 illustrates a repeating sequence of frames 600. As shown in FIG. 6, a frame may have a duration of five (5) msec and contains both DL and UL sub-frames. A superframe may be defined as 20 msec in duration and contains four frames (four pairs of DL and UL sub-frames). A first DL sub-frame 610 is denoted DL1, a second DL sub-frame is denoted DL2 612, a third DL sub-frame is denoted DL3 616, a fourth DL sub-frame is denoted DL4 618, and a fifth DL sub-frame (part of a different superframe) is denoted DL1 620.

The timing of some broadcast information may be associating with the superframe timing. For example, broadcast information 605 can be transmitted in the first subframe of the first frame of the superframe.

Figure 7:
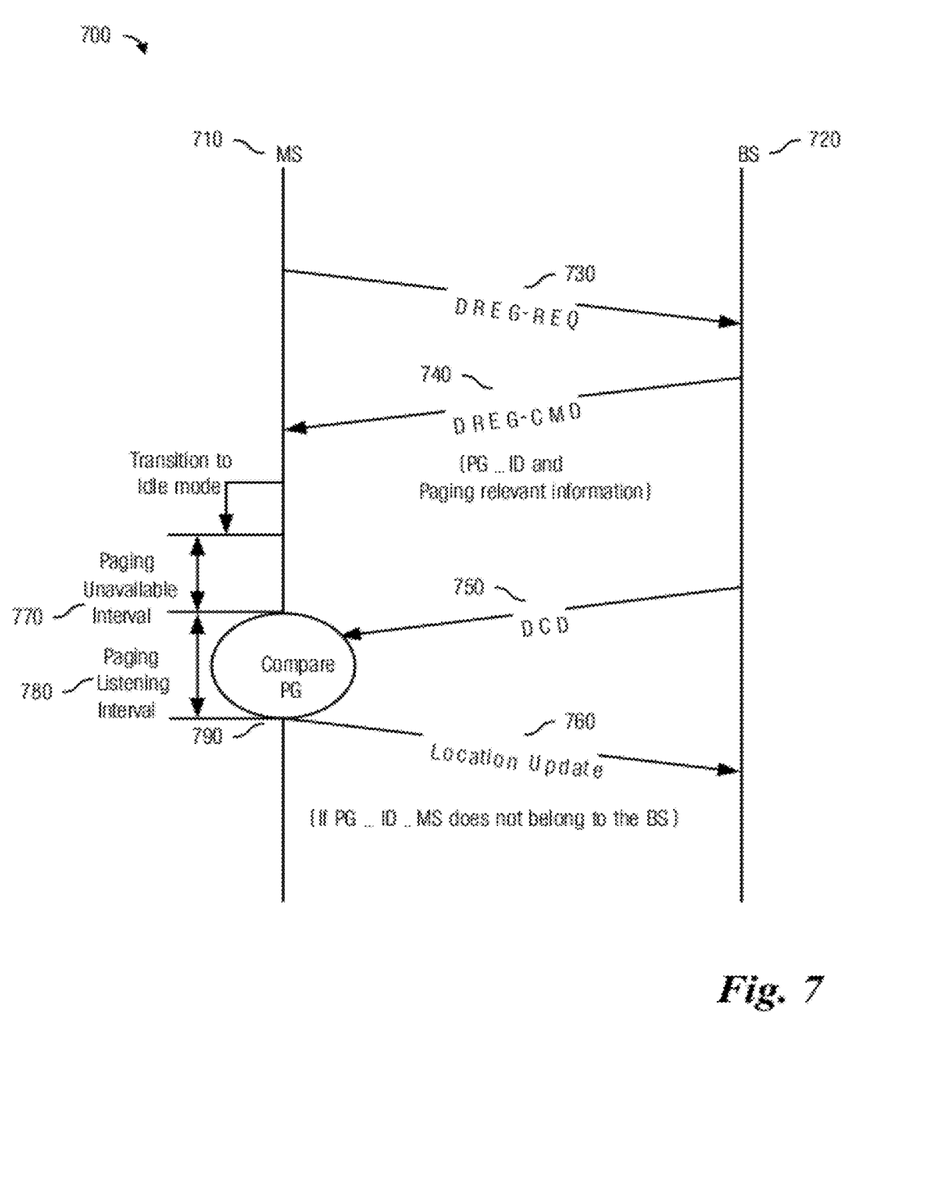
FIG. 7 is a diagram of a signaling sequence of a paging operation.

FIG. 7 illustrates a signaling sequence 700 of a paging operation. As shown in FIG. 7, the message names are as defined by the IEEE 802.16 standard. A MS 710 and BS 720 may begin by exchanging management media access control (MAC) messages. MS 710 may send a MAC management message "DREG-REQ" 730 to BS 720 in order to request a transit to idle mode for power saving purposes. BS 720 may respond to MAC management message "DREG-REQ" 730 with a MAC management message "DREG-CMD" 740. MAC management message "DREG-CMD" 740 may include a paging group identifier (PG_ID) and paging relevant information such as listening interval, unavailable interval, paging offset, and so on. BS 710 may then enter idle mode with the parameters provided in MAC management message "DREG-CMD" 740.

During an interval 770 (referred to as a paging unavailable interval) MS 710 may discontinue communication with BS 720 and reduce power consumption by powering down its transmitter and/or receiver. BS 710 may wake up during interval 780 (referred to as a paging listening interval) and may receive a DL channel descriptor (DCD) message 750 from BS 720. After which, MS 710 may compare its own PG_ID assigned by BS 720 via MAC management message "DREG-CMD" 740 with a current PG_ID given by DL channel descriptor (DCD) message 750 (operation 790).

MS 710 may immediately perform a location update 760 if its own PG_ID (provided by MAC management message "DREG-CMD" 740) does not match with the current PG_ID given by DL channel descriptor (DCD) message 750 (i.e., the PG_ID provided by BS 720).

If its own PG_ID does match the current PG_ID given by DL channel descriptor message 750, then MS 710 may continue with the paging operation.

Figure 8:
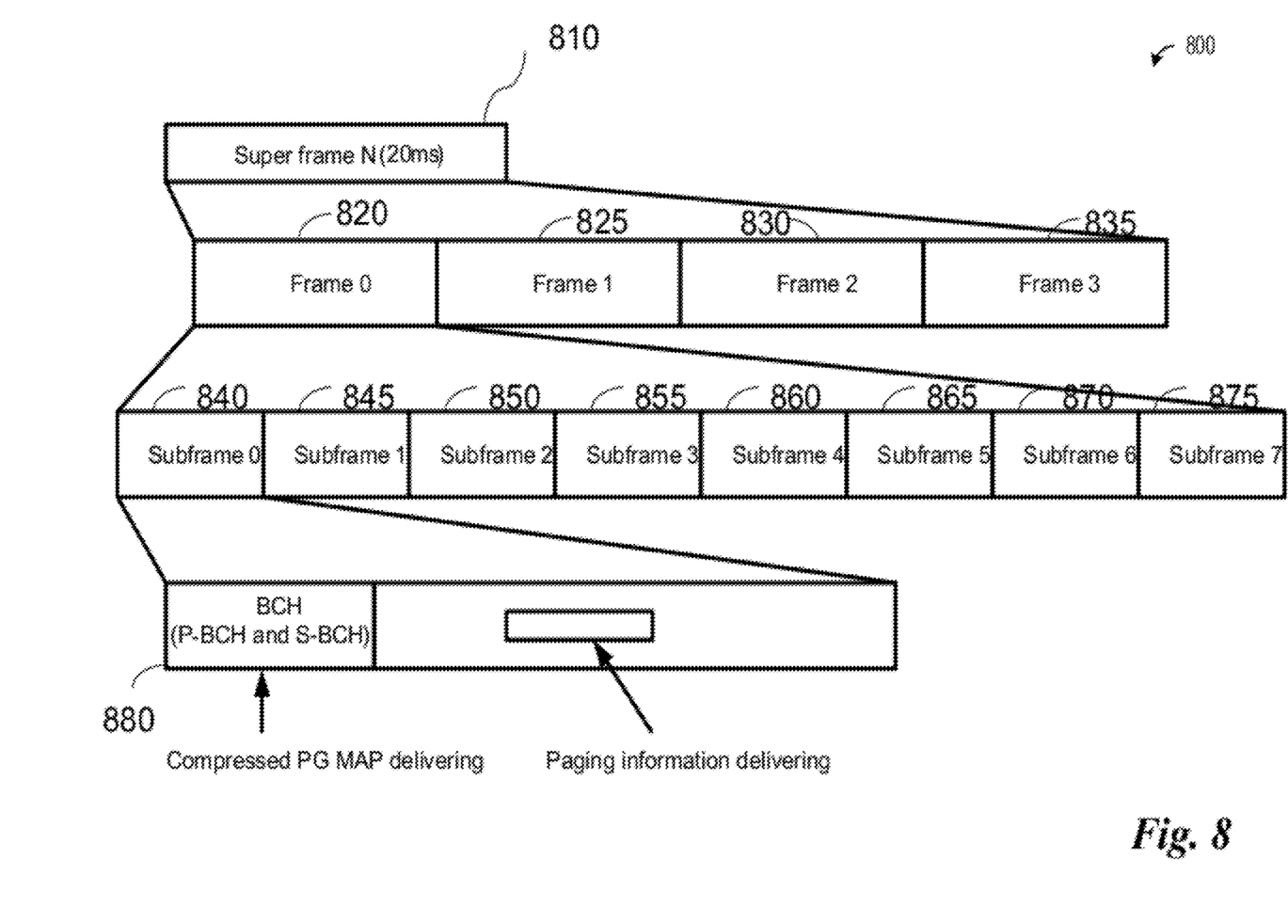
FIG. 8 is a diagram of a frame structure for delivering a compressed paging group (PG) map.

FIG. 8 illustrates a frame structure 800 for delivering a compressed paging group (PG) map. As shown in FIG. 8, the frame structure 800 may be used on a broadcast channel (BCH) in IEEE802.16m compliant wireless communications systems. A paging operation may be aligned to a superframe time slot, 810. The super frame (20 ms) comprises four (4) frames 820, 825, 830 and 835, with each frame being five (5) ms long. In turn, each frame consists of eight (8) subframes 840, 845, 850, 855, 860, 865, 870 and 875, with each subframe being 0.625 ms long.

The broadcasting channels: Primary BCH (P-BCH) and Secondary BCH (S-BCH) 880 may carry cell and communications system centric information at the beginning of the superframe. According to an embodiment, the paging group map information may be carried on either of BCHs, i.e., the P-BCH or the S-BCH.

Figure 9:
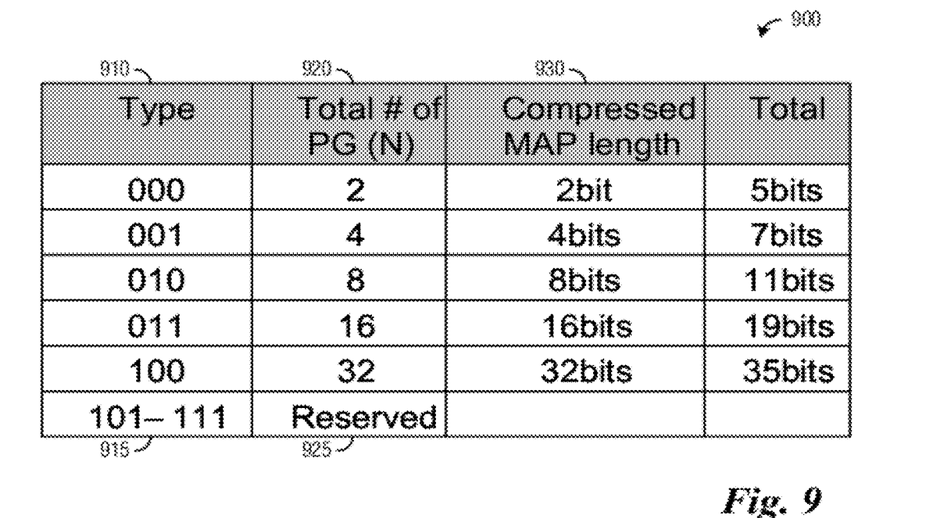
FIG. 9 is a diagram of a dynamic compressed PG map structure.

FIG. 9 illustrates a dynamic compressed PG map structure 900. PG map 900 includes a type field 910, which presents possible configurations of the compressed PG map delivered on the BCH. Reserved values of type field 910, with values 101-111 (shown as entry 915), may be used to extend the total number of PG (N) supported in the communications system (shown as field 920). A total compressed PG map length (shown as field 930) may be determined based on the total number of PGs (N) (field 920). For example, if the total number of PGs (N) is 32, the total compressed PG map may be 35 bits long (32 bits for the compressed PG map and 3 bits for the type field). If type field 910 (3 bits) is transmitted to the MS through a DREG-CMD (De-registration command) message during a negotiating of the idle mode transition, or through any of a variety of MAC messages with system parameters information sent by the BS during initialization or registration procedures, it may not be shown in the compressed paging group MAP.

Currently, IEEE802.16e compliant communications systems provide up to 256 PGs. However, in conventional communications systems deployments, five (5) to six (6) PGs are typically provided. Therefore reserved bits (shown in field 925) may be extended as communications system requirements change. FIG. 9 illustrates an example of a possible configuration mapping between type field 910 and a total number of PGs (N) (field 920). Therefore, the configuration mapping of a communications system may be freely configured based on communications system requirements and performance needs.

As shown in FIG. 9, type field 910 may be transmitted separately from contents of compressed PG MAP or transmitted together with contents of compressed PG MAP.

Figure 10:
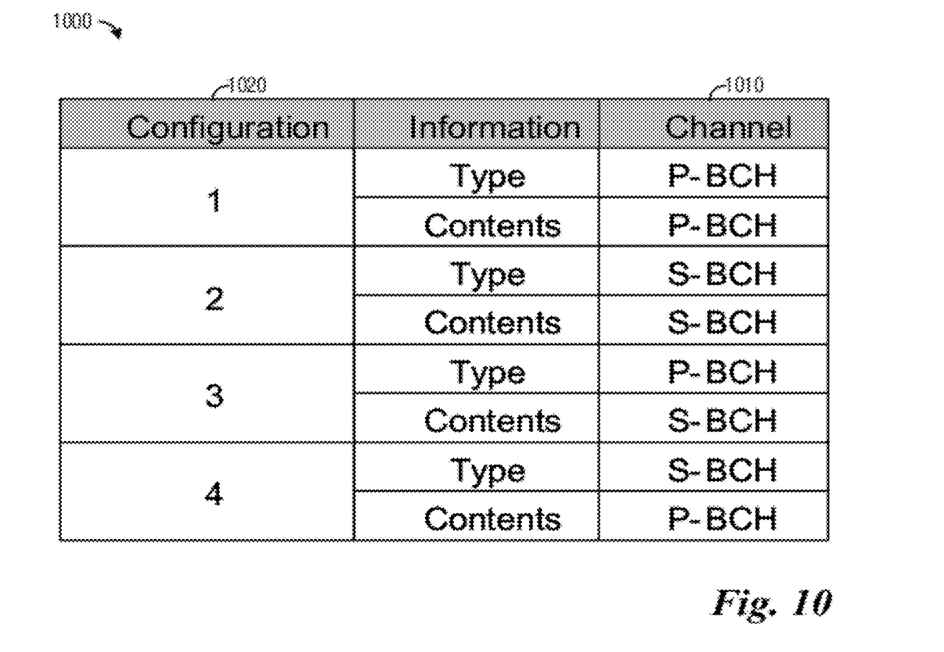
FIG. 10 is a diagram of possible channel configurations of a compressed PG map structure.

FIG. 10 illustrates possible channel configurations 1000 of a compressed PG map structure. As shown in FIG. 10, the possible channels (either P-BCH or S-BCH) for transmitting the compressed PG map are shown in field 1010. Type field and contents of PG MAP can be transmitted together or separately based on configuration. There may be four configurations (shown in field 1020): configurations 1, 2, 3 and 4.

In case of static compressed PG map usage, a fixed bit length PG map (which is carried on BCH) may be associated with a total maximum number of PGs, which may be determined as a system parameter or indicated by a BS. In addition, the type field (3 bits long, for example) might not be included in the BCH due to the already fixed bit length of the PG. Since the structure of the BCH has a fixed bit length, the fixed bit length PG map may be helpful in the estimation of BCH length. For example, if the total number of PGs is determined as 16, a compressed PG map that is 16 bits long is always transmitted on the BCH.

Figures 11, 12:
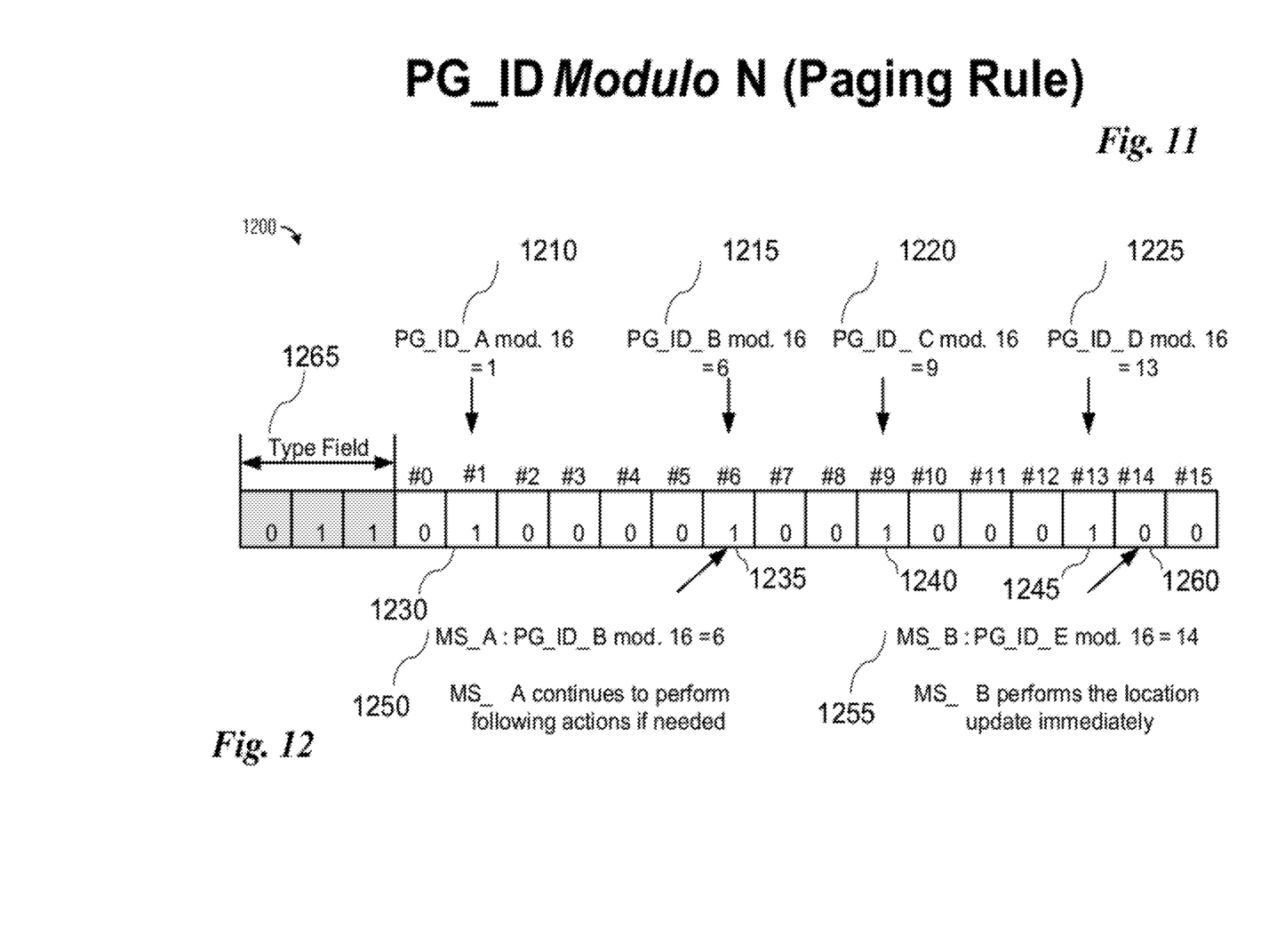
FIG. 11 is a diagram of a mapping rule.
FIG. 12 is a diagram of a dynamic compressed PG map structure.

FIG. 11 illustrates a mapping rule using modulo operation between PG_ID given by a BS and bit position of the compressed PG map. Through the use of the mapping rule, a MS may be able to determine if it is in or out of its paging zone, i.e., if a current PG_ID provided by a BS is equal to the MS' own PG_ID.

Using the paging rule, the MS does not need to receive a 24-bit long MAC hashing function. Rather, the MS may simply refer to a particular, pre-defined bit position in the compressed PG map to determine if it is in or out of its paging zone. Based on the bit value at the bit position, the MS may be able to quickly make a decision whether it has to perform the location update or not. The following provides definitions for the mapping rule:

PG_ID—a 16 bit long paging group identifier assigned to the MS

N—a total number of paging groups.

Based on the paging rule, the MS may look up a value of the compressed PG map at a bit position that may be determined by applying the paging rule to its own PG_ID. If the value of the compressed PG map at the bit position is set to "1", for example, then the MS recognizes that it belongs to the same paging group as the BS. The MS may then continue to perform further paging operation if needed. Else (the value of the compressed PG map at the bit position is set to "0", for example), the MS may perform the location update since it is not in its paging zone.

FIG. 12 illustrates a dynamic compressed PG map structure 1200 and usage of paging rule. As shown in FIG. 12, the maximum number of PG is 256 based per the current IEEE802.16e specification. However, 256 PGs may be redundant for a compact IEEE802.16m communications system design, and up to 16 PGs is a reasonable value for the compact IEEE802.16m communications system design. However, the limitation is a practical limitation and is not a limitation of the embodiments. Therefore, the discussion of 16 PGs should not be construed as being limiting to either the scope or the spirit of the embodiments.

For discussion purposes, the BS belongs to four PGs (PG_ID_A, PG_ID_B, PG_ID_C and PG_ID_D), 1210, 1215, 1220 and 1225, respectively. The BS (using the paging rule) sets the corresponding bits (#1, #6, #9 and #13), 1230, 1235, 1240 and 1245, to "1" and transmits the compressed PG map on the BCH. The MS has to look up the specific bit position of the BCH according to modulo operation (i.e., the paging rule). Since MS_A belongs to PG_ID_B, 1250, and MS_B belongs to PG_ID E, 1255, they have to look at bit position #6, 1235, and bit position #14, 1260, respectively. Based on the values of these bit position, MS_A may continue with the paging operation if needed. However, MS_B may quickly perform the location update since MS_B is not in its paging zone.

Basic assumptions in FIG. 12 are as follows:
N=16.
The BS belongs to the following PGs: PG_ID_A, PG_ID_B, PG_ID_C and PG_ID_D).

PG_ID allocated to the MS_A: PG_ID_B, 1250.
PG_ID allocated to the MS_B: PG_ID E, 1255.
Assuming that a 3 bit long type field is carried on BCH 1265 together with the compressed PG map.

Figure 13:
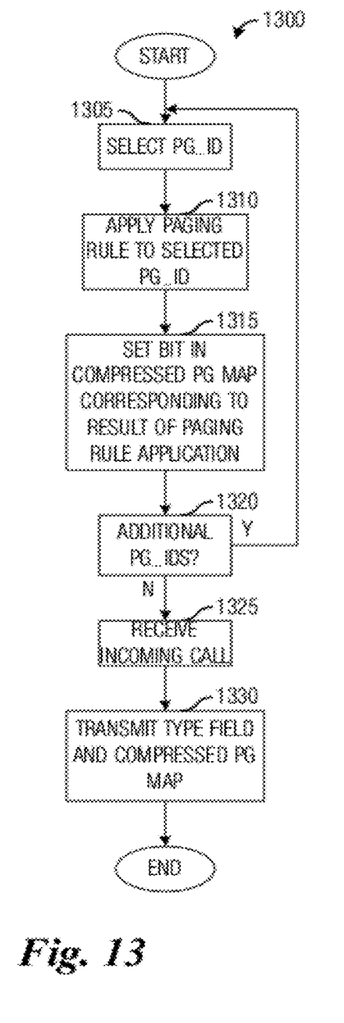
FIG. 13 is a flow diagram of BS operations in a paging operation.

FIG. 13 illustrates a flow diagram of BS operations 1300 in a paging operation. BS operations 1300 may be indicative of operations occurring in a BS, such as BS 260, as the BS participates in a paging operation to inform an MS of an incoming call or connection. BS operations 1300 may occur at regularly specified intervals. Alternatively, BS operations 1300 may occur when the BS detects that there is an incoming call or connection for a MS. BS operations 1300 may continue as long as the BS continues to operate in a normal operating mode.

BS operations 1300 may begin with the BS generating a compressed PG map. The generating of the compressed PG map may begin with selecting an identifier (PG_ID) of one of the paging groups to which it belongs (block 1305). With the PG_ID selected, the BS may apply a paging rule, such as shown in FIG. 11 (PG_ID modulo N), to the selected PG_ID (block 1310). The paging rule may be applied with N being the maximum number of paging groups in a wireless communications system containing the BS. As a result of the application of the paging rule to the selected PG_ID, a numerical value within a range 0 to N−1 may be produced.

The BS may set a bit in its compressed PG map corresponding to the numerical value (block 1315). For example, if the numerical value is equal to K, wherein K is within the range of 0 to N−1, then the K-th bit in the compressed PG map may be set. According to an embodiment, the BS may set the bit to a value of one (1).

Since it may be possible for the BS to belong to multiple paging groups, the BS may check to determine if there are any additional paging group identifiers that it has not selected and used to set the compressed PG map (block 1320). If there are additional paging groups, then the BS may return to block 1305 to select another paging group. If there are no more paging groups, then the BS may be complete in its generation of the compressed PG map.

The BS may then receive an incoming call or connection (block 1325). The incoming call may be intended for a MS that is a member of a paging group of which the BS is a member. The BS may then transmit a type field, which may be used to indicate information such as a number of paging groups, and the compressed PG map (block 1330). As discussed previously, both the type field and the compressed PG map may be transmitted in a BCH. According to an embodiment, the type field and the compressed PG map may be transmitted together or separately in a P-BCH, a S-BCH, or a combination of both. For example, both the type field and the compressed PG map may be transmitted in a P-BCH or a S-BCH. Alternatively, the type field may be transmitted in a P-BCH or a S-BCH and the compressed PG map may be transmitted in a S-BCH or a P-BCH. BS operations 1300 may then terminate.

Figure 14:
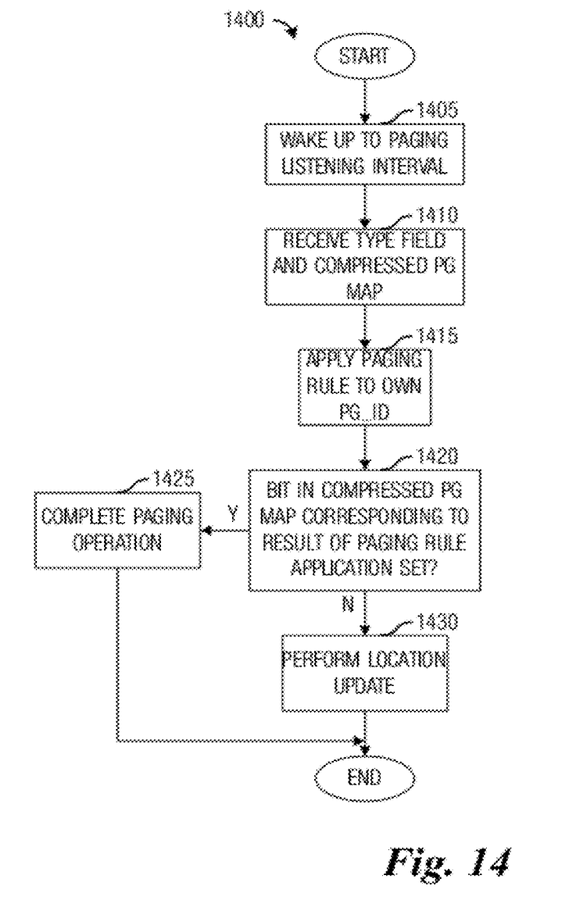
FIG. 14 is a flow diagram of MS operations in a paging operation.

FIG. 14 illustrates a flow diagram of MS operations 1400 in a paging operation. MS operations 1400 may be indicative of operations occurring in a MS, such as MS 120, while the MS is in an idle mode. While operating in the idle mode, the MS may spend a portion of the time in a sleep mode (a paging unavailable interval) and a portion of a time listening for an incoming page (a paging listening interval). The MS may periodically enter the paging listening interval to determine if there is an incoming call or connection for the MS. MS operations 1400 may continue as long as the MS is operating in the idle mode.

MS operations 1400 may begin with the MS entering the paging listening interval to listen for an incoming page (block 1405). If there is an incoming page, then the MS may receive a type field that indicates a number of paging groups and a compressed PG map which indicates the paging groups that are the target of the incoming page (block 1410).

The MS may apply a paging rule, such as shown in FIG. 11 (PG_ID modulo N), to its own paging group identifier (own PG_ID) (block 1415). The paging rule may be applied with N (provided by the type field) being the maximum number of paging groups in a wireless communications system containing the BS. As a result of the application of the paging rule to the own PG_ID, a numerical value within a range 0 to N−1 may be produced.

The MS may perform a check to determine if a bit at a position corresponding to the numerical value is set (block 1420). For example, if the numerical value is equal to K, wherein K is within the range of 0 to N−1, then the MS may check if the K-th bit in the compressed PG map is set. According to an embodiment, the bit may be set to a value of one (1) to indicate that the incoming page is intended for the paging group.

If the bit at the position corresponding to the numerical value is set, then the MS may proceed with completing the paging operation (block 1425). However, if the bit at the position corresponding to the numerical value is not set, then the MS may need to perform a location update to inform the wireless communications system of its current position so that paging messages may be delivered to the correct BS or paging group. The location update may include notifying a BS currently serving the MS and receiving a PG_ID corresponding to the BS currently serving the MS. MS operations 1400 may then terminate.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating a communications device, the method comprising:
    receiving a compressed paging group (PG) map, wherein the compressed PG map comprises a plurality of indicator bits;
    applying a modulo paging rule to a PG identifier (PG_ID) of the communications device, wherein applying the modulo paging rule to the PG_ID comprises dividing the PG_ID by a total number of paging groups to produce a remainder value;
    identifying one of the indicator bits in the compressed PG map based on the remainder value, wherein the identified indicator bit is located at a position within the compressed PG map that corresponds to the remainder value; and
    initiating a location update if the identified indicator bit of the compressed PG map is not set to a specified value of either zero (0) or one (1).

2. The method of claim 1, wherein the paging rule is expressible as PG_ID modulo N,
    where N is a number of total paging modulo(X,N) returns an integer remainder of X divided by N.

3. The method of claim 1, further comprising receiving a type indication that indicates a format of the compressed PG map.

4. The method of claim 1, wherein when the identified indicator bit of the compressed PG map is set to the specified value, the method further comprises:
    sending a response message to a controller, wherein the response message requests a traffic channel; and
    notifying a user of the communications device of an incoming call.

5. The method of claim 1, wherein initiating the location update comprises:
    notifying a controller serving the communications device; and
    receiving an updated paging group identifier.

6. The method of claim 1, wherein the communications device is operating in an idle mode, and the method further comprises, waking up to listen for an incoming page.

7. The method of claim 6, wherein waking up comprises turning on a radio receiver.

8. A method for operating a base station operation, the method comprising:
    applying a modulo paging rule to a paging group identifier (PG ID) of the base station, wherein applying the modulo paging rule comprises dividing the PG ID by a total number of paging Stoups to obtain a remainder value;
    setting one of a plurality of indicator bits in a compressed paging group (PG) map to a specified value of zero (0) or one (1), wherein the set indicator bit is located based on the remainder value; and
    broadcasting the compressed PG map to a mobile station, wherein receiving the compressed PG map causes the mobile station to initiate a location update if the set indicator bit is not set to indicate a certain value.

9. The method of claim 8, further comprising broadcasting a type field to the mobile station along with the compressed PG map, wherein the type field indicates the total number of paging groups.

10. The method of claim 8, wherein the certain value is a one (1) or a zero (0).

11. A base station for providing low overhead paging the base station comprising:
    a processor; and
    a computer readable medium storing programming for execution by the processor, the programming including instructions to:
    apply a modulo paging rule to a paging group identifier (PG_ID) of the base station, wherein applying the modulo paging rule comprises dividing the PG_ID by a total number of paging groups to obtain a remainder value;
    set one of a plurality of indicator bits in a compressed paging group (PG) map to a specified value of zero (0) or one (1), wherein the set indicator bit is located based on the remainder value; and broadcast the compressed PG map to a plurality of communications devices serviced by the base station, wherein receiving the compressed PG map causes one or more of the plurality of communications devices to initiate a location update if the set indicator bit is not set to indicate a certain value.

12. The base station of claim 11, wherein the programming further includes instructions to broadcast a type indication specifying the number of paging groups along with the compressed PG map.

13. The base station of claim 12, wherein the type indication and the compressed PG map are broadcast over a single channel.

14. The base station of claim 12, wherein the type indication and the compressed PG map are broadcast separate channels.

15. The base station of claim 12, wherein the type indication and the compressed PG map are broadcast over a primary broadcast channel, a secondary broadcast channel, or both.

16. The base station of claim 12, wherein the type indication is a three-bit value appended to the compressed PG map.

17. The base station of claim 11, wherein the modulo paging rule is expressible as:
PG_ID modulo N,
where N is the number of total paging groups, and modulo (X,N) returns an integer remainder of X divided by N.

18. The base station of claim 17, wherein the set indicator bit is set to a one (1) value.

19. The base station of claim 11, wherein one or more of the communications devices are serviced by a primary controller, or a secondary controller in a paging group to which the primary controller also belongs.

20. The base station of claim 11, wherein the certain value is a one (1) or a zero (0).

* * * * *